(12) United States Patent
Velner et al.

(10) Patent No.: US 9,175,985 B2
(45) Date of Patent: Nov. 3, 2015

(54) HYBRID PHOTODETECTOR

(75) Inventors: Eli Velner, Ra'anana (IL); Moshe Porat-Forshlager, Nes-ziona (IL); Bar-Navi Michael, Ramla (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 605 days.

(21) Appl. No.: 13/553,356

(22) Filed: Jul. 19, 2012

(65) Prior Publication Data
US 2014/0021334 A1   Jan. 23, 2014

(51) Int. Cl.
| G01N 21/86 | (2006.01) |
| G01V 8/00 | (2006.01) |
| G01D 5/34 | (2006.01) |
| G01V 8/14 | (2006.01) |

(52) U.S. Cl.
CPC . *G01D 5/342* (2013.01); *G01V 8/14* (2013.01)

(58) Field of Classification Search
CPC .................................. G03C 7/30; G03D 13/08
USPC ............................ 250/221, 208.2; 355/27–30; 396/567–570
See application file for complete search history.

(56) References Cited

U.S. PATENT DOCUMENTS

| 6,783,902 | B2 * | 8/2004 | Szajewski et al. ............... 430/21 |
| 7,675,622 | B2 | 3/2010 | Johnson | |
| 8,041,264 | B2 * | 10/2011 | Suchy et al. ................... 399/223 |
| 2003/0211408 | A1 * | 11/2003 | Szajewski et al. ............... 430/21 |
| 2011/0075131 | A1 | 3/2011 | Wayman et al. | |
| 2011/0096118 | A1 | 4/2011 | Burke et al. | |
| 2011/0248151 | A1 | 10/2011 | Holcombe et al. | |

FOREIGN PATENT DOCUMENTS

| JP | 6072594 B | 9/1994 |
| WO | WO 2008/146414 A1 | 12/2008 |

OTHER PUBLICATIONS

Gai et al.; "System Design of Double Sheet Detection with Ultrasonic Sensor"; 2011 International Conference on Mechatronic Science, Electric Engineering and Computer; Aug. 19-22, 2011; pp. 1888-1891.

* cited by examiner

*Primary Examiner* — Seung C Sohn

(57) ABSTRACT

A hybrid photodetector employing both transmissive and reflective detection techniques for detecting objects having differing light transmission and reflection properties are in conveyance.

20 Claims, 6 Drawing Sheets

HYBRID PHOTODETECTOR

BACKGROUND

Typically, the use of a beam of light as a detection tool for various objects is based on either measuring reflection or transmission of the detection beam by way of a photo sensor. The effectiveness of such methods depends largely on the optical qualities of the object in question; some objects are most effectively detected by way of reflection-based detection while other objects are most effectively detected using transmission-based detection.

Applications involving multiple objects in which each object has a different optical characteristics generally require multiple photodetectors

BRIEF DESCRIPTION OF THE DRAWINGS

The features, primary components, and method of operation of the hybrid photodetector may best by way of the following detailed description and accompanying drawings in which.

DETAILED DESCRIPTION

Figure 1:
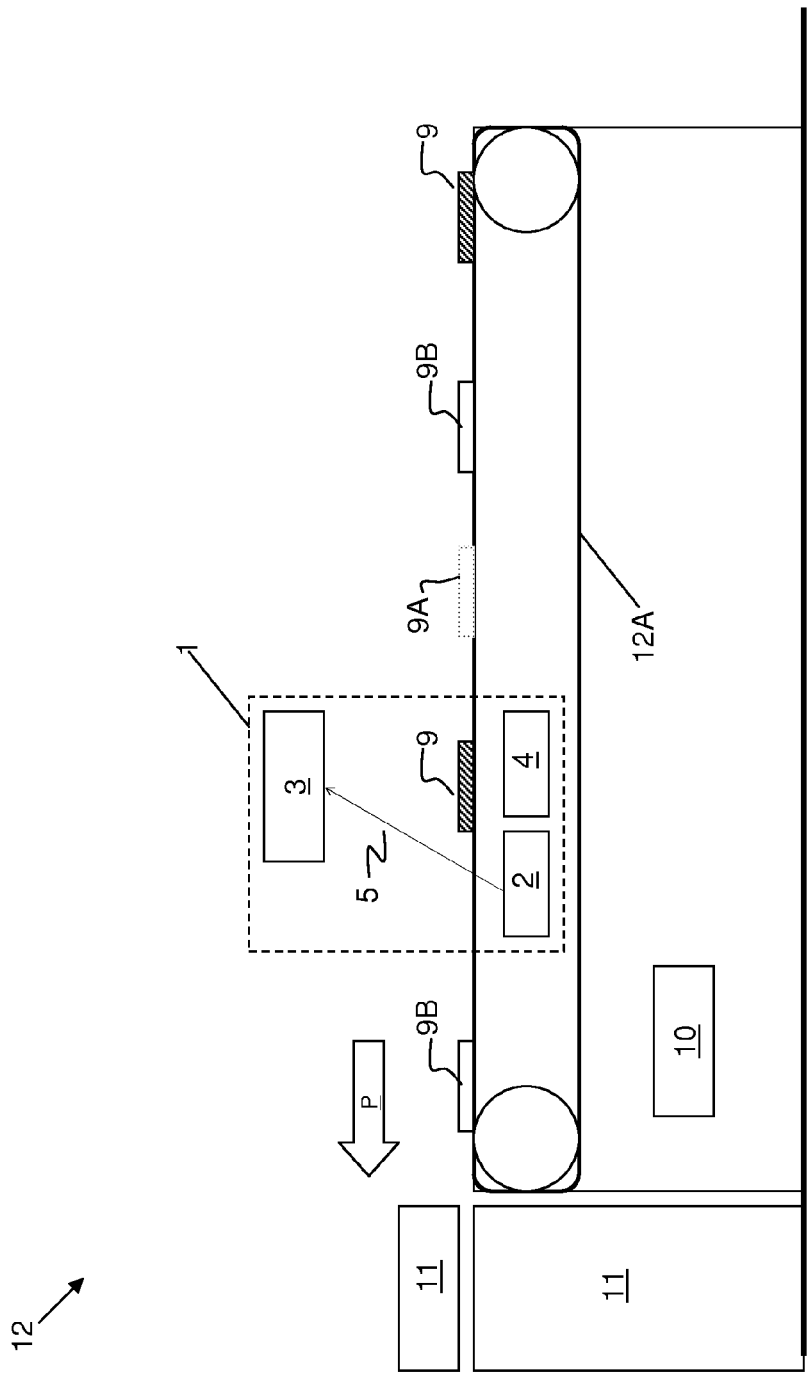
FIG. 1 is a schematic side view of a conveyer system and associated printing engine controlled by a hybrid photodetector actuated controller, according to an example.

In the following description of the hybrid photodetector it should be appreciated that well-known methods, procedures, and components are not described in detail for the sake of clarity.

The hybrid photodetector is directed at detecting objects at a precise location using a single photodetector for multiple objects in which light reflection and transmission characteristics of one object differ from those of another object, as noted above. The hybrid photodetector has application in robotics, printing, and other applications requiring precise detection of such objects. Without diminishing from the scope, for the purposes of this document the hybrid photodetector will be discussed in the context of substrate detection for printing operations In printing operations, for example, detection of the substrate onto which content is to be printed, identifying the precise location of the substrate is crucial to ensure proper alignment of content on the substrate.

The following terms will be used throughout the document:

"Transmissive" refers an optical quality of an object enabling light to pass through.

"Traverse" refers to the passing of an object through a detection beam by way of relative motion between the object and the beam. For example, the detection beam may be held stationary while the object passes through the beam or the object held stationary while the beam is moved over the object, or both the beam and the object are moved in a manner preserving relative motion between them.

"Sensor" refers to a light sensor and additional associated circuitry needed to produce output voltages responsively to an incident light beam.

"Reflection sensor" refers to a photo sensor disposed in a position to receive a light beam reflected from an object in question.

"Transmission sensor" refers to a photo sensor disposed in a position to receive a light beam passing through the object in question. In examples of the hybrid photo sensor discussed in this document, the reflection detector is disposed underneath a substrate and the transmission sensor is disposed above the substrate; however, it should be appreciated that in other examples in which the sensors may be disposed in other relative positions so as to provide the needed functionality.

"Transmission-sensor voltage" refers to a voltage output determined by a transmission sensor.

"Reflection-sensor voltage" refers to a voltage output determined by a reflection sensor.

"Photodetector" refers to the overall device including the transmission and the reflection sensors.

"Hybrid photodetector" refers to a photodetector employing either reflection or transmission detection techniques or both simultaneously.

"Light beam" refers to a beam of light used to detect the object; the beam may be any suitable frequency, like infrared, visible, or ultraviolet. Throughout this document light beam and detection beam are used interchangeably.

"Printing system" refers to an overall system including a printing engine configured to apply content to substrates and conveyance and related control systems.

"Substrate" refers to sheet material like; inter alias, white paper, colored paper, transparent overlays, polymeric sheets of various colors, and cardboard.

Turning now to the figures, FIG. 1 depicts a conveyer system 12 conveying substrates 9, 9A, and 9B towards a printing system 11 on conveyer belt 12A, a controller 10 for synchronizing printing operations of printing engine 11 with substrate conveyance, a hybrid photodetector 1 including a light source 2, transmission sensor 3 and a reflections sensor 4, according to an example.

In operation, as substrates 9-9B may be conveyed on conveyer belt 11 in direction "P" towards the printing engine 11 they may traverse light beam 5 emanating from light source 4. According to the reflective and transmissive properties of substrate 9-9B, light beam 5 transmission sensor 3 and/or reflection sensor 4 receive a beam having emanated from light source 4 when the substrate 9-9B is disposed at a known location and outputs an electrical signal that may be used by controller 10 to synchronize conveyance and printing operations, according to an example.

Figure 1A:
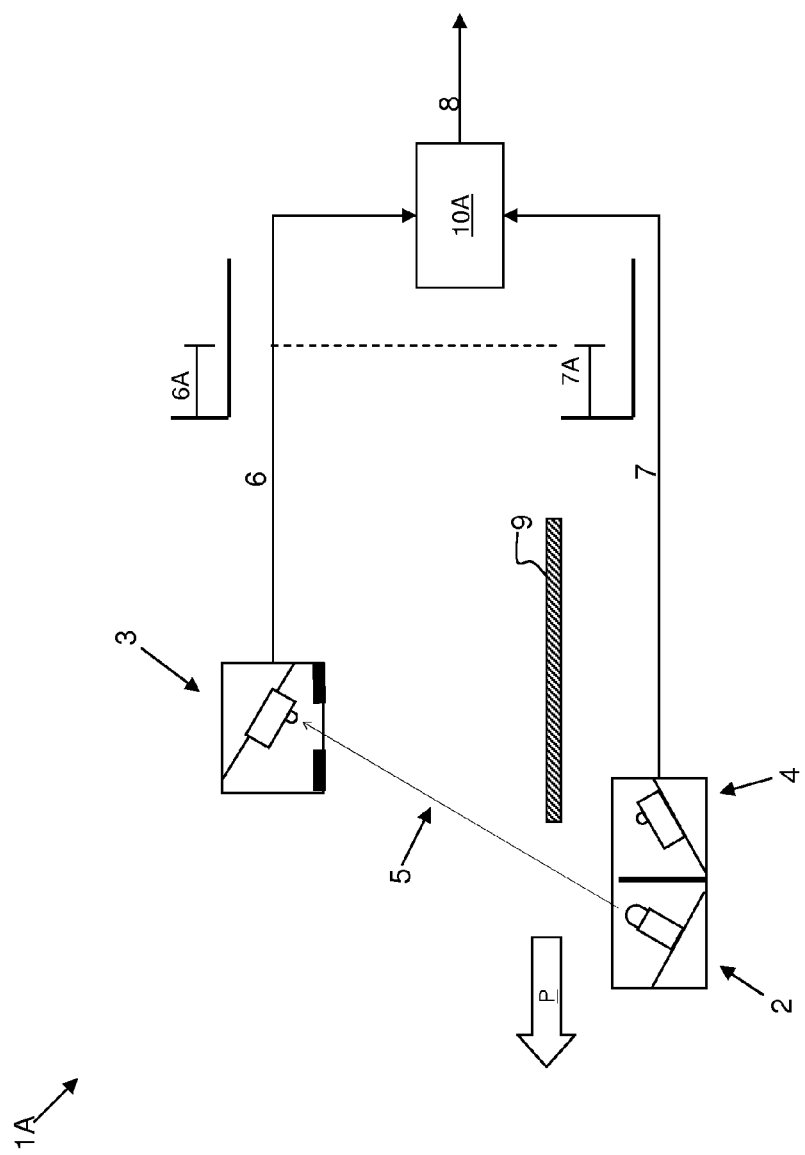
FIG. 1A is a schematic view of a hybrid photodetector in an initialized state with associated output voltages, according to an example.

FIG. 1A is schematic view of a hybrid photodetector 1A and its initial output voltages prior to detection of substrate 9. As noted above, hybrid photodetector 1A includes a light source 2, a transmission sensor 3 for receiving light beam 5 directed across a travel path of substrate 9, and a reflection sensor 4 for receiving reflection beam 5A from a reflective substrate as will be described. Both photo sensors 3 and 4 are configured to produce output voltages 6 and 7, respectively that are combined into a composite voltage 8, according to examples.

During operation, light beam 5 emanates from light source 2 and propagates across the travel path "P" of substrate 9 and may be received by transmission sensor 4. In the initialization stage prior to object detection, transmission sensor 3 may generate an output voltage 6, at level 6A, according to examples. Reflection sensor 4 may also generate an inverted output voltage 7, at level 7A such that both output voltages 6 and 7 have the same voltage levels 6A and 7A even though reflection sensor 4 is not receiving reflection beam 5A, according to examples. It should be appreciated that additional examples include inverted transmission sensor 3 and non-inverted refection sensor 4, or both sensors 3 and 4 are non-inverted. A non-limiting example of a non-inverted sensor is OPB716 and a non-limiting example of an inverted sensor is OPB718.

Figure 2:
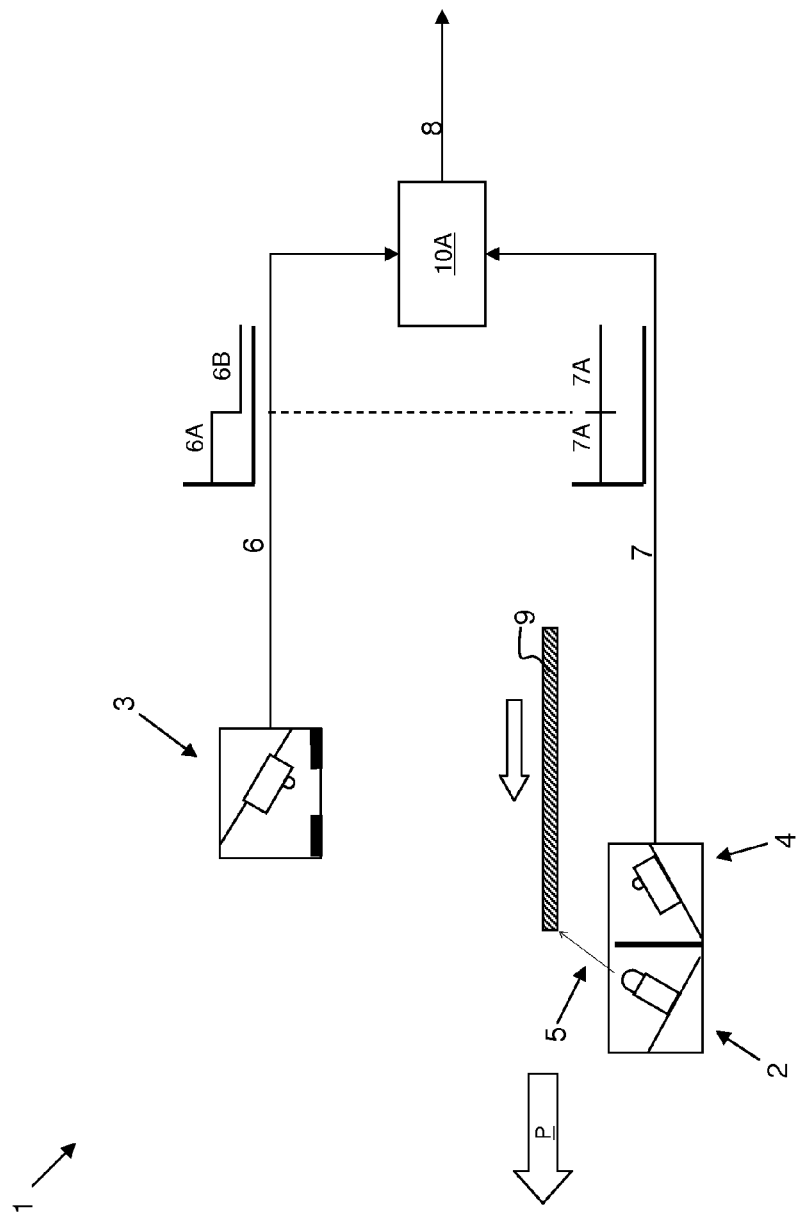
FIG. 2 is a schematic view of a hybrid photodetector in a transmission-based detection mode of a non-reflective substrate and associated output voltages, according to an example.

Turning now to FIG. 2, non-transmissive and non-reflective substrate 9 may advance along its path of travel "P" into detection beam 5 thereby interrupting its propagation to transmission sensor 3. Output voltage 6 may now be generated at a new level 6B and the output voltage 7 of reflection sensor 4 may maintain the output voltage 7 at the same voltage level 7A generated during initialization, according to examples. It should be appreciated that for the purposes of the document all new voltage levels are considered new in terms of the voltage levels produced during initialization. As noted above, output voltages 6 and 7 are combined into a new composite voltage 8. Composite voltage 8 may be combined by way of shunt circuitry or by way of a microprocessor in various examples.

It should be appreciated that in certain examples of the hybrid photodetector, changes in the intensity of the light beam received by transmission sensor 3 may also be accomplished by moving a substrate or other object out of the path of light beam 5.

Figure 3:
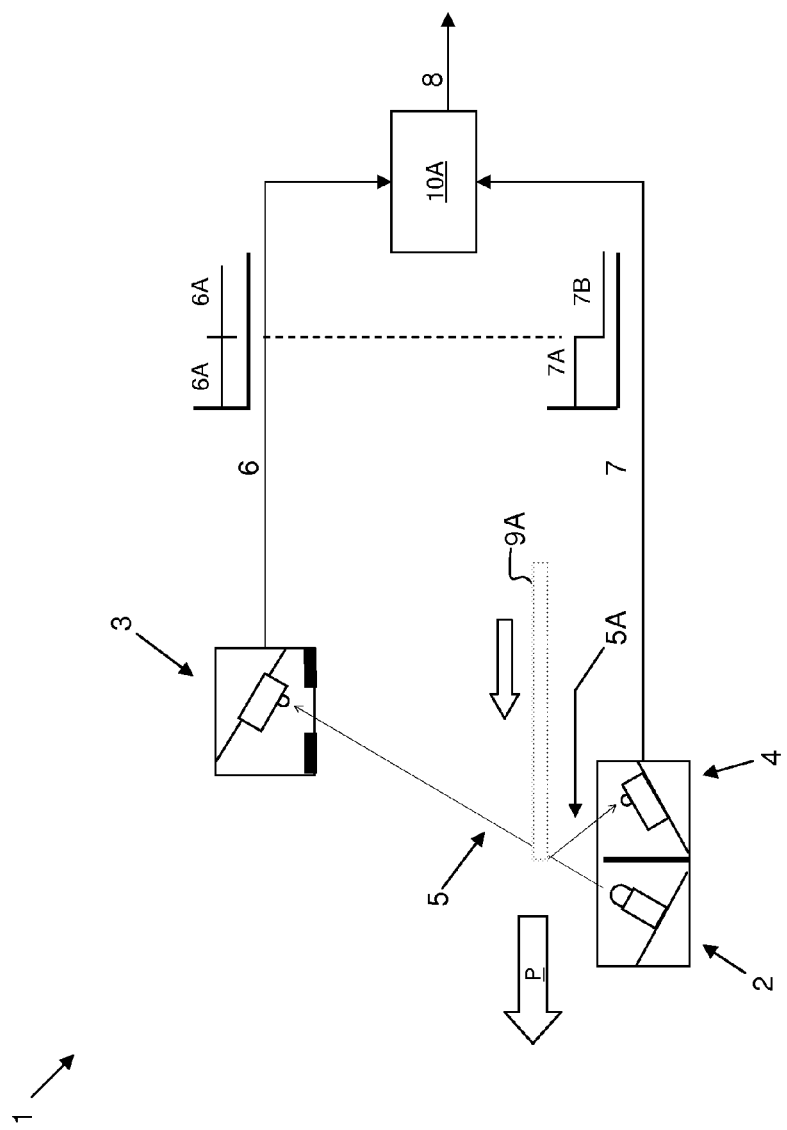
FIG. 3 is a schematic view of a hybrid photodetector in a reflection-based detection mode of a transparent substrate and associated output voltages, according to an example.

FIG. 3 depicts hybrid photodetector 1 operative for a transparent substrate 9A in which the majority of detection beam 5 may propagate through substrate 9A and a portion is reflected from substrate 9A as reflected beam 5A and received by reflection sensor 4. Output voltage 6 remains at the initialization level 6A since there was effectively no change in the level of beam 5 received by transmission sensor 3. Reflection sensor 4 produces a new, inverted voltage level 7B less than the previous initialization voltage level 7A, according to examples. As noted above, the new voltages 6 and 7 are combined into a new composite voltage 8, according to examples.

Figure 4:
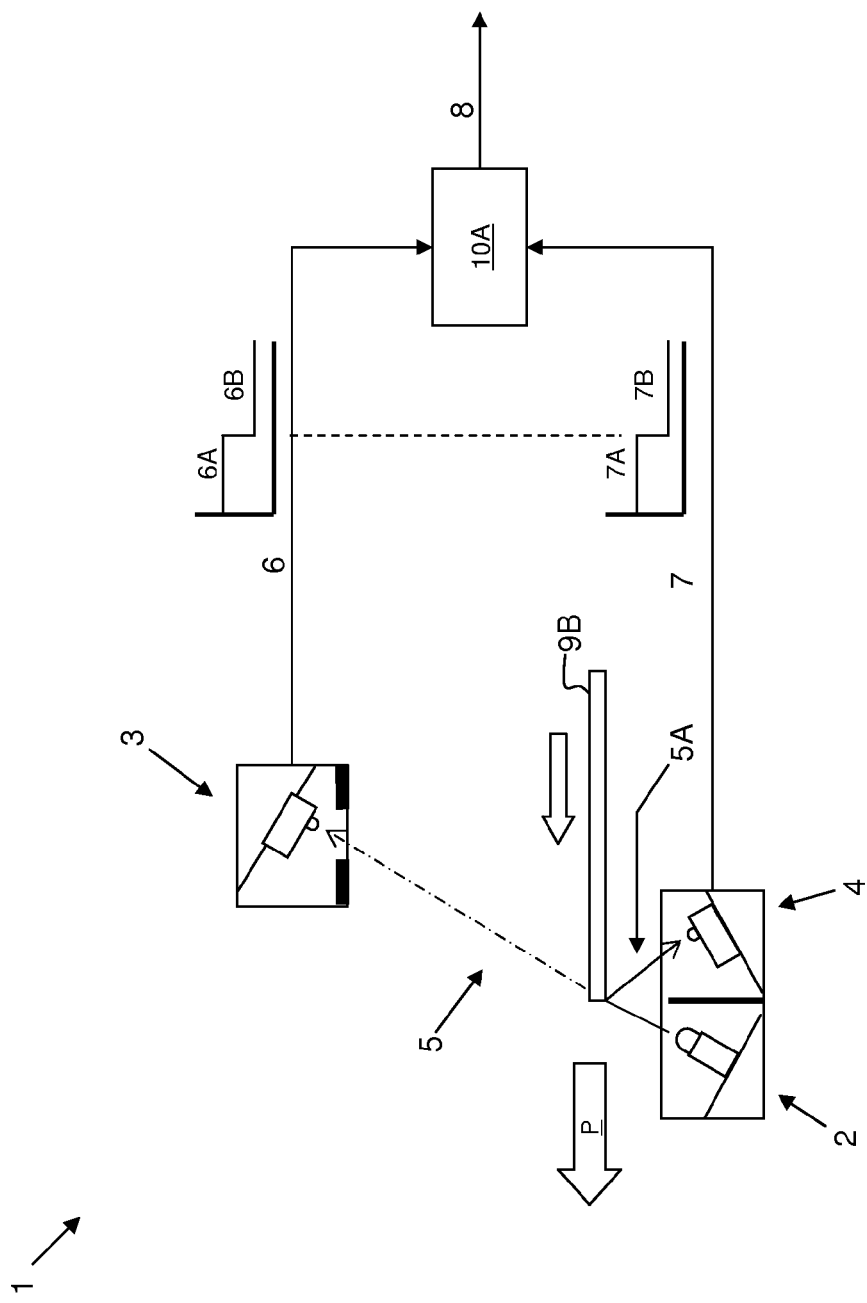
FIG. 4 is a schematic view of a hybrid photodetector in combined transmission and reflection-based detection modes of a white substrate and associated output voltages, according to an example.

FIG. 4 depicts the hybrid photo detector operative for a white, transmissive and reflective substrate 9B. As shown, white substrate 9B blocks a portion of detection beam 5 such that transmission sensor 3 detects a reduction in beam 5 and therefore outputs voltage 6 at a new, lower level 6B. As noted, white substrate 9B also reflects a portion of beam 5 as reflected beam 5A. Reflection sensor 4 receives reflected beam 5A and outputs inverted voltage 7 at a new, lower level 7B, according to examples. As noted above, the new voltages 6 and 7 are then combined into composite voltage 8.

Figure 5:
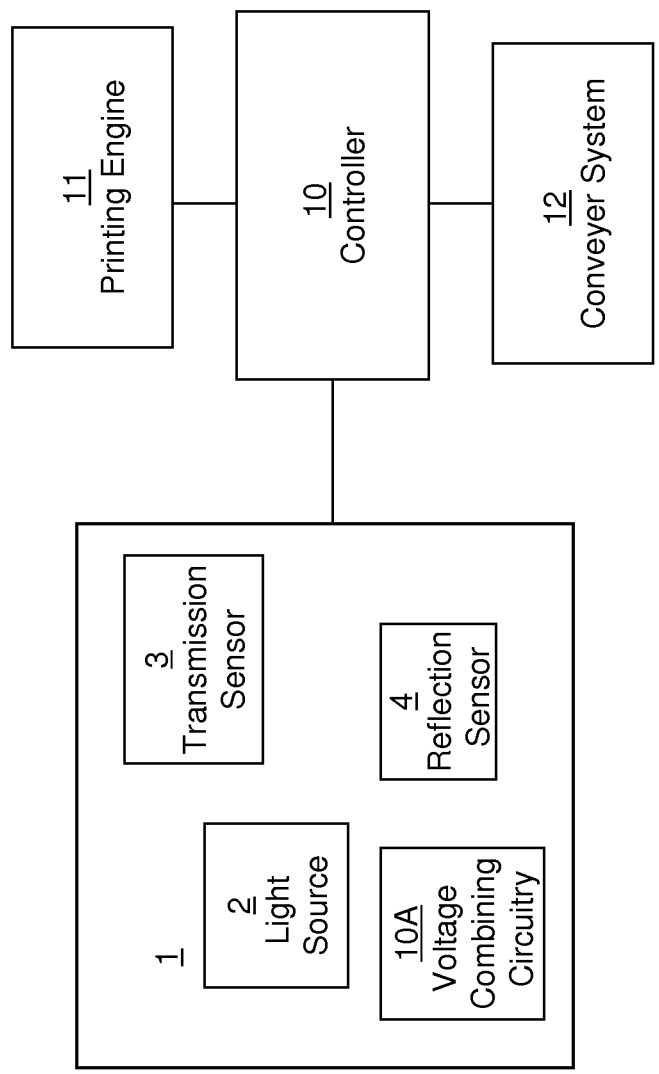
FIG. 5 is a block diagram of the hybrid photodetector operationally linked to a printing engine and a conveyer system.

FIG. 5 is a block diagram of the hybrid photodetector 1 linked to controller 10 configured to synchronize printing activities of printing engine 11 with conveyance of substrates by conveyer system 12, according to an example. It should be appreciated that in certain examples output sensor voltage outputs are combined by circuitry inherent to the overall detector 1 as shown, element 10A, and in other examples the voltage outputs may be combined by circuitry external to detector 1. Examples of the hybrid photodetector include the above described components; light source 2, transmission and reflection sensors, 3 and 4 respectively, and voltage combing circuitry 10A, according to an example.

Controller 10 may be operatively linked to printing engine 11 and conveyer system 12 to provide automatic control of either printing or substrate conveyance in which conveyance, printing or both may be delayed, accelerated, or halted in accordance with substrate detection.

It will be appreciated that for the sake of clarity, elements shown in the figures have not necessarily been drawn to scale and reference numerals may be repeated in different figures to indicate corresponding or analogous elements.

What is claimed is:

1. A hybrid photodetector comprising:
    a light source to direct a light beam across a travel path of an object;
    a transmission sensor to receive the light beam and to output a transmission-sensor voltage responsive to changes in the received light beam, the changes in the received light beam being caused by the object diminishing propagation of the light beam across the travel path;
    a reflection sensor to receive a reflection of the light beam from the object and to output a reflection-sensor voltage responsive to changes in the received reflection of the light beam from the object; and
    circuitry to combine the transmission-sensor voltage and the reflection-sensor voltage into a composite voltage.

2. The hybrid photodetector of claim 1, wherein the reflection-sensor voltage is to be inverted into an inverted logic state prior to being combined with the transmission-sensor voltage.

3. The hybrid photodetector of claim 1, wherein the circuitry to combine the transmission-sensor voltage and the reflection-sensor voltage into composite voltage is further to communicate the composite voltage to a printing engine.

4. The hybrid photodetector of claim 1, wherein the circuitry includes a microprocessor.

5. The hybrid photodetector of claim 1, wherein the transmission sensor is disposed above the travel path of the object.

6. The hybrid photodetector of claim 1, wherein the reflection sensor is disposed below the travel path of the object.

7. The hybrid photodetector of claim 1, wherein the light beam has a frequency chosen from the group consisting of infrared light, visible light, and ultraviolet light.

8. A printing system for printing on substrates having differing light transmission and reflection properties; the system comprising:
    a conveyer system; and
    a hybrid photodetector operatively linked to the conveyer system, the photodetector including:
        a light source to direct a light beam across a travel path of a substrate being conveyed on the conveyer system,
        a transmission sensor to receive the light beam and to output a transmission sensor voltage responsive to changes in the received light beam, the changes in the received light beam being caused by the substrate diminishing propagation of the light beam across the travel path,
        a reflection sensor to receive a reflection of the light beam from the substrate and to output a reflection sensor voltage responsive to changes in the received reflection of the light beam from the substrate; and
        circuitry to combine the transmission sensor voltage and the reflection sensor voltage into a composite voltage.

9. The system of claim 8, wherein the reflection sensor voltage is to be inverted into an inverted logic state prior to being combined with the transmission sensor voltage.

10. The system of claim 8, wherein the circuitry to combine the transmission-sensor voltage and the reflection-sensor voltage into the composite voltage is further to communicate the composite voltage to a printing engine.

11. The system of claim 8, wherein the circuitry includes a microprocessor.

12. The system of claim 8, wherein the light beam has a frequency chosen from the group consisting of infrared light, visible light, and ultraviolet light.

13. The system of claim 8, further comprising:
a printing engine, wherein the conveyer system is operationally linked to the printing engine.

14. The system of claim 8, wherein the substrate is substantially transparent.

15. The system of claim 8, wherein the substrate is substantially reflective.

16. A method of detecting substrates having differing light transmission and reflection properties, the method comprising:
directing a light beam from a light source across a travel path of a substrate;
receiving the light beam in a transmission sensor;
outputting, from the transmission sensor, a transmission-sensor voltage responsively to a diminishment of intensity of the light beam received by the transmission sensor when the substrate begins to traverse the light beam;
receiving a reflection of the light beam from the substrate in a reflection sensor;
outputting, from the reflection sensor, a reflection-sensor voltage responsively to a change in the reflection of the light beam from the substrate; and
combining the outputted transmission-sensor voltage and the outputted reflection-sensor voltage into a composite voltage.

17. The method of claim 16, further comprising inverting the outputted reflection-sensor voltage into an inverted logic state prior to combining the outputted reflection-sensor voltage with the outputted transmission-sensor voltage.

18. The method of claim 16, further comprising communicating the composite voltage to a printing engine.

19. The method of claim 16, wherein the circuitry includes a microprocessor.

20. The method of claim 16, wherein the light beam has a frequency chosen from the group consisting of infrared light, visible light, and ultraviolet light.

* * * * *